Figure 1:
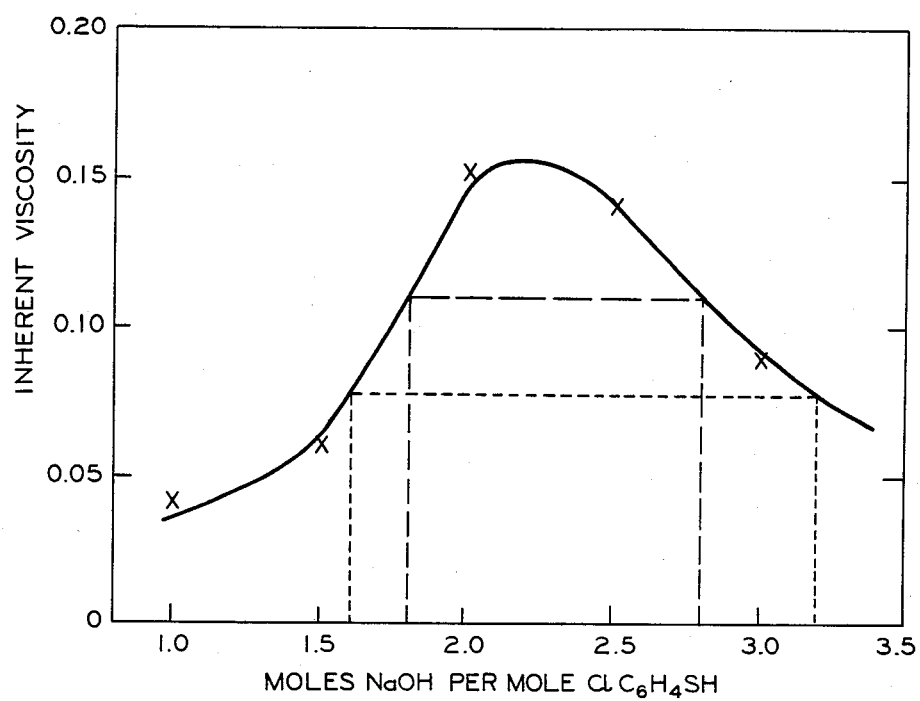

United States Patent [19]

Geibel et al.

[11] Patent Number: 4,544,735

[45] Date of Patent: Oct. 1, 1985

[54] PREPARATION OF POLY(ARYLENE SULFIDE) FROM HALOTHIOPHENOL AND ALKALINE METAL HYDROXIDE

[75] Inventors: Jon F. Geibel; Michael D. Cliffton; Timothy P. Murtha, all of Bartlesville, Okla.

[73] Assignee: Phillips Petroleum Company, Bartlesville, Okla.

[21] Appl. No.: 618,295

[22] Filed: Jun. 7, 1984

[51] Int. Cl.$^4$ ............................................. C08G 75/14
[52] U.S. Cl. .................................................... 528/374
[58] Field of Search ........................................ 528/374

[56] References Cited

U.S. PATENT DOCUMENTS 3,354,129 11/1967 Edmonds, Jr. et al. .............. 260/79
3,940,375 2/1976 O'Shaughnessy et al. ........ 260/79.1

Primary Examiner—Harold D. Anderson
Attorney, Agent, or Firm—A. W. Umphlett

[57] ABSTRACT

A method for producing poly(arylene sulfide) of high molecular weight by subjecting to polymerization conditions a reaction mixture of alkaline metal hydroxide, halothiophenol and organic amide with a molar ratio of alkaline metal hydroxide to halothiophenol in a range of about 1.6 to about 3.2.

5 Claims, 1 Drawing Figure

4,544,735

PREPARATION OF POLY(ARYLENE SULFIDE) FROM HALOTHIOPHENOL AND ALKALINE METAL HYDROXIDE

BACKGROUND OF THE INVENTION

This invention relates to the production of arylene sulfide polymers. In one of its aspects, this invention relates to a novel method for producing arylene sulfide polymers and to the polymers themselves. In another of its aspects, this invention relates to the variation of the properties of arylene sulfide polymers depending on the proportions of the reactants used.

In one or more of its specific aspects, this invention pertains to a novel method for producing polymers such as those produced by the method of U.S. Pat. No. 3,354,129 and other processes for producing arylene sulfide polymers. U.S. Pat. No. 3,354,129 discloses a method for producing polymers from polyhalo-substituted aromatics, alkali metal sulfides and polar organic compounds. There have been other methods set forth using similar reactants, like U.S. Pat. No. 3,940,375 which uses an alkali metal salt of a halothiophenol as sulfur source in the polymerization.

It has now been discovered that the molecular weight of the polymer produced in the polymerization of a reaction mixture of halothiophenol, alkali metal hydroxide, and organic amide can be increased by increasing the molar ratio of alkali metal hydroxide to halothiophenol used as reactants.

It is, therefore, an object of this invention to provide a method for producing arylene sulfide polymers having a high molecular weight. It is another object of this invention to provide a method for controlling the molecular weight of arylene sulfide polymer by adjusting the molar ratio of reactants used in producing the polymer.

Other aspects, objects, and the advantages of this invention will come apparent upon reading this specification and the appended claims.

STATEMENT OF THE INVENTION

According to this invention, a method is provided for producing polymers in which alkali metal hydroxide, organic amide and halothiophenol are contacted to form a reaction mixture with the alkali metal hydroxide and halothiophenol present in a molar ratio in a range of about 1.6 to about 3.2 alkali metal hydroxide to halothiophenol so that by maintaining at least a portion of the reaction mixture at polymerization conditions a polymer having a high molecular weight is produced.

Halothiophenols which can be used in the process of this invention can be represented by the formula XRSH, where R is a divalent hydrocarbon radical selected from arylene, alkyl-substituted arylene, cycloalkyl-substituted arylene, and aryl-substituted arylene, the number of carbon atoms in said R group being within the range of 6 to about 20 and X is a halogen selected from fluorine, chlorine, bromine, and iodine.

Examples of some applicable halothiophenols which can be employed in the process of this invention include 1-chloro-4-mercaptobenzene (p-chlorothiophenol), 1-methyl-2-bromo-4-mercaptobenzene, 1-ethyl-2-isopropyl-4-fluoro-5-mercaptobenzene, 1-butyl-2-hexyl-3-chloro-4-mercaptobenzene, 1-decyl-2-bromo-4-mercaptobenzene, 1-tetradecyl-3-iodo-5-mercaptobenzene, 1-bromo-2-cyclohexyl-4-mercaptobenzene, 1-phenyl-2-chloro-3-mercaptobenzene, 1-fluoro-4-mercaptonaphthalene, 4-chloro-4-mercaptobiphenyl, and the like, and mixtures thereof. P-chlorothiophenol is preferred.

The organic amides for use in the process of this invention should be substantially liquid at the reaction temperatures and pressures employed. The amides can be cyclic or acyclic and can have 1 to about 10 carbon atoms per molecule. Examples of some suitable amides include formamide, acetamide, N-methylformamide, N,N-dimethylformamide, N,N-dipropybutramide, 2-pyrrolidone, N-methyl-2-pyrrolidone, caprolactam, N-methyl-caprolactam, N,N-ethylenedi-2-pyrrolidone, hexamethylphosphoramide, tetramethylurea, and the like, and mixtures thereof. N-methyl-2-pyrrodidone is preferred.

Alkali metal hydroxides which can be employed in the process of this invention include lithium hydroxide, sodium hydroxide, potassium hydroxide, rubidium hydroxide, cesium hydroxide, and mixtures thereof. It is critical to the present invention that the molar ratio of alkali metal hydroxide per mole of halothiophenol be maintained within a range of about 1.6 to about 3.2, preferably in a range of about 1.8 to about 2.8 and most preferably within a range of about 2.0 to about 2.4, so as to maximize the inherent viscosity of the formed polymer.

The drawing accompanying this disclosure is a graph showing the relationship of the inherent viscosity of the polymer produced to the mole ratio of sodium hydroxide per mole of p-chlorothiophenol, the preferred alkali metal hydroxide and preferred halothiophenol for use in the present invention using the data that was developed in the example that will be presented later in this disclosure. The drawing graphically sets out the ranges within which the invention is operable.

It has been hypothesized that the reaction mechanism of the invention set out herein using elevated ratios of alkali metal hydroxide to halothiophenol is quite different from the reaction mechanism when equal molar amounts are used. This hypothetical difference in reaction mechanisms accounts for the production of high molecular weight polymers by the process of the present invention while low molecular weight polymers are produced using equal molar amounts of the alkali metal hydroxide and the halothiophenol. It is thought that by using equal molar amounts that the alkali metal salt of the halothiophenol is produced. This salt then self-condenses to produce the polymer and sodium choloride byproduct. Contrast this to the proposed mechanism for the present invention in which an excess of alkali metal hydroxide permits not only the reaction with the halothiophenol to produce the sodium salt of the halothiophenol but also a reaction between the alkali metal hydroxide and the oganic amide, usually N-methyl-2-pyrrolidone, to form the alkali metal aminoalkanoate. The reaction between the alkali metal aminoalkanoate and the alkali metal salt of the halothiophenol forms poly(arylene sulfide) of high molecular weight.

The temperature at which the polymerization is conducted can vary over a wide range but generally will be within the range of about 125° C. to about 450° C., preferably about 175° C. to about 350° C. The reaction time also can vary considerably, depending in part on the reaction temperature, but generally will be within the range of about 10 minutes to about 3 days, preferably about 1 hours to about 8 hours. The reaction can be conducted at a variety of pressures, but the reaction pressure should be sufficient to maintain the organic amide and the halothiophenol substantially in the liquid phase.

The arylene sulfide polymers produced by the process of this invention can be separated from the reaction mixture by conventional procedures, e.g. by filtration of the polymer, followed by washing with water, or by dilution of the reaction mixture with water, followed by filtration and water washing of the polymer, optionally with additional washing with methanol or the like.

The arylene sulfide polymers produced by the process of this invention can be blended with fillers, pigments, extenders, other polymers, and the like. They can be cured through crosslinking and/or chain extension, e.g., by heating at temperatures up to about 480° C. in the presence of a free oxygen-containing gas to provide cured products having high thermal stability and good chemical resistance. They are useful in the production of coatings, films, molded objects and fibers.

The following examples are offered to show the best mode for carrying out the present invention. These examples are meant to be illustrative and should not be taken as restrictive.

EXAMPLE I

In this example the experimental setup for preparing poly(phenylene sulfide) (PPS) by reaction of NaOH and p-chlorothiophenol is described. A 1-liter stirred autoclave (Model AB-100S; Autoclave Engineers, Tulsa, OK) was charged with about 3.5 moles (338 ml) of N-methylpyrrolidone (NMP; technical grade; supplied by BASF Wyandotte Corp., Parsippany, NJ), 1.0 mole (144.6 grams) of p-chlorothiophenol (supplied by Aldrich Chemical Company, Milwaukee, Wisconsin; lot AH D114 ME) and variable amounts (0.5–3 moles) of solid NaOH (reagent grade; supplied by Mallinckrodt, Inc., St. Louis, Mo; lot KPGK). The reactor was sealed and degassed six times by pressurizing with about 200 psi $N_2$, with stirring, and subsequent venting. The reactor was sealed and heated to about 160°–165° C. Then the reactor was vented, a stream of about 0.5 scfm $N_2$ was flushed through the reactor headspace, and the reactor temperature was increased to about 210° C. over a period of about 45–60 minutes. During this time, about 14–20 ml of distillate was collected by cooling of the exiting $N_2$ stream. The reactor was sealed again and heated at about 245° C. for about 3 hours, with constant agitation. Then the reactor was allowed to cool to about 120° C. with agitation, and subsequently was cooled overnight to room temperature without agitation.

The formed solid polymer was removed from the reactor, washed several times with hot water, and subsequently dried in a vacuum oven at about 80° C. (run 4 at 60° C.) until no more change in weight of the polymer sample was detected. The dry material was then analyzed. The yield ranged from 72–88% of the theoretical yield based on p-chlorothiophenol.

EXAMPLE II

Pertinent properties of five PPS samples, prepared with different amounts of NaOH essentially in accordance with the procedure described in Example I, are summarized in Table I.

Table I shows the most significant result of the test series: the inherent viscosity (IV) and extrusion rate (both measures of the molecular weight of PPS) exhibit a maximum at a molar ratio (n) of NaOH to p-chlorothiophenol of about 2:1. Plotting of IV vs. n in FIG. 1 reveals that an acceptable IV of at least about 0.08 is attained for n ranging from about 1.6 to about 3.2. A preferred range for n is about 1.8 to about 2.8 (IV: at least about 0.11). The most preferred molar NaOH:p-chlorothiophenol ratio is about 2.0–2.4 (IV: about 0.15).

TABLE I

| | | Polymer Properties | | | | | | Polymer Composition | | |
|---|---|---|---|---|---|---|---|---|---|---|
| Run | Molar Ratio of NaOH:ClC$_6$H$_4$SH | Inherent Viscosity[1] | Extrusion Rate[2] | Tg(°C.)[3] | Tc(°C.)[3] | Tm(°C.)[3] | Ash[4] (Wt-%) | C (Wt-%) | H (Wt-%) | S (Wt-%) |
| 1 (Control) | 1.0:1 | 0.04 | —[5] | <50 | 85 | 253 | 0.37 | 66.0 | 4.0 | 28.8 |
| 2 (Control) | 1.5:1 | 0.06 | —[5] | 76 | 112 | 264 | 0.71 | 65.9 | 4.0 | 27.4 |
| 3 (Invention) | 2.0:1 | 0.15 | 162 | 81 | 118 | 268 | 0.16 | 66.3 | 3.7 | 29.7 |
| 4 (Invention) | 2.0:1 | 0.15 | 328 | 74 | 130 | 242 | 0.57 | 66.6 | 3.7 | 29.2 |
| 5 (Invention) | 2.5:1 | 0.14 | 112 | 80 | 121 | 277 | 1.00 | 66.0 | 3.8 | 29.5 |
| 6 (Invention) | 3.0:1 | 0.09 | 5435 | 73 | 109 | 272 | 1.27 | 65.5 | 4.0 | 28.3 |

[1]measured on 0.4 weight-% solutions in 1-chloronaphthalene, at 206° C.;
[2]measured at 600° F. with an extrusion plastometer having a die orifice length of 1.250 inches and a die diameter of 0.0825 inch, and employing a driving weight of 360 grams; reported values are in grams of polymer extruded in 10 minutes;
[3]glass transition temperature (Tg), crystallization temperature (Tc) and melting point (Tm) of the polymer were determined by rapidly quenching (with liquid N$_2$) a melted polymer sample and heating the thus formed substantially amorphous polymer at a rate of 20° C./minute in a differential scanning calorimeter;
[4]residue after combustion of polymer;
[5]too fluid for accurate measurement.

We claim:
1. A method for producing high molecular weight poly(arylene sulfide) comprising:
   (a) contacting alkali metal hydroxide, organic amide, and halothiophenol to form a reaction mixture, said halothiophenol represented by the formula XRSH, where R is a divalent hydrocarbon radical selected from arylene, alkyl-substituted arylene, cycloalkyl-substituted arylene, or aryl-substituted arylene, the number of carbon atoms in said R group being within the range of 6 to about 20 and X being a halogen selected from fluorine, chlorine, bromine, or iodine, said alkali metal hydroxide and halothiophenol present in a molar ratio of about 1.6 to about 3.2 alkali metal hydroxide to halothiophenol, and
   (b) maintaining at least a portion of said reaction mixture at polymerization conditions to produce a polymer.

2. A method of claim 1 wherein the molar ratio of alkali metal hydroxide to halothiophenol is in the range of about 1.8 to about 2.8.

3. A method of claim 2 wherein the molar ratio of alkali metal hydroxide to halothiophenol is in the range of about 2.0 to about 2.4.

4. A method of claim 1 wherein the halothiophenol is chosen from among the group consisting of 1-chloro-4-mercaptobenzene (p-chlorothiophenol), 1-methyl-2-bromo-4-mercaptobenzene, 1-ethyl-2-isopropyl-4-fluoro-5-mercaptobenzene, 1-butyl-2-hexyl-3-chloro-4-mercaptobenzene, 1-tetradecyl-3-iodo-5-mercaptobenzene, 1-bromo-2-cyclohexyl-4-mercaptobenzene, 1-phenyl-2-chloro-3-mercaptobenzene, 1-fluoro-4-mercaptonaphthalene, 4-chloro-4-mercaptobiphenyl, and mixtures thereof.

5. A method of claim 4 wherein the halothiophenol is p-chlorothiophenol, the alkali metal hydroxide is sodium hydroxide, and the organic amide is N-methyl-2-pyrrolidone.

* * * * *